C. S. LOCKWOOD.
TIE BAR FOR ROLLER BEARING CAGES.
APPLICATION FILED SEPT. 16, 1920.
1,389,313. Patented Aug. 30, 1921.
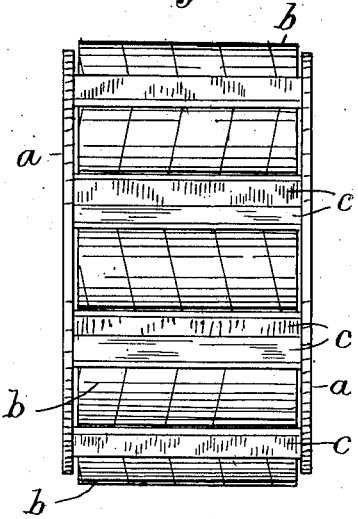
Fig. 1.
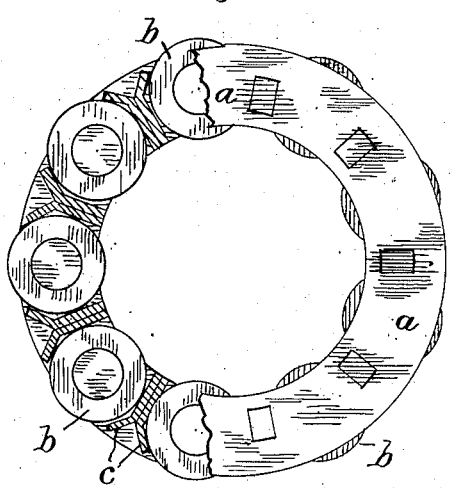
Fig. 2.
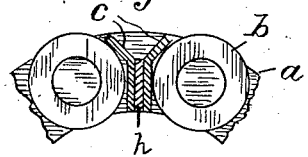
Fig. 11.
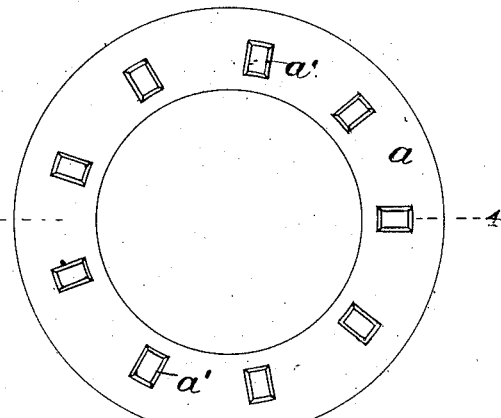
Fig. 3.
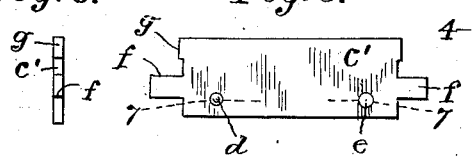
Fig. 6. Fig. 5.
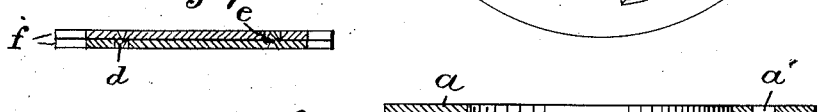
Fig. 7.
Fig. 4.
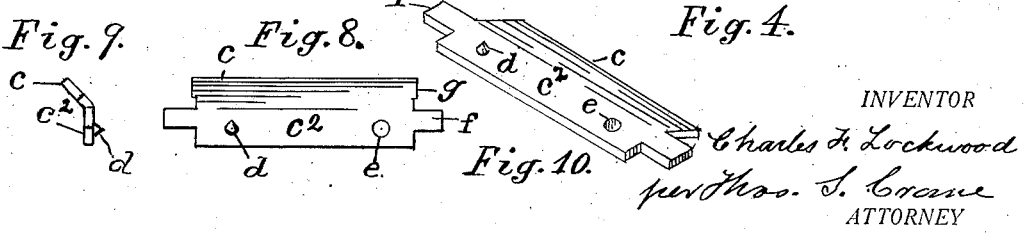
Fig. 9. Fig. 8. Fig. 10.
INVENTOR
Charles F. Lockwood
per Thos. S. Crane
ATTORNEY

UNITED STATES PATENT OFFICE.

CHARLES S. LOCKWOOD, OF NEWARK, NEW JERSEY, ASSIGNOR TO HYATT ROLLER BEARING DIVISION, UNITED MOTORS CORPORATION, OF HARRISON, NEW JERSEY, A CORPORATION OF NEW YORK.

TIE-BAR FOR ROLLER-BEARING CAGES.

1,389,313.   Specification of Letters Patent.   Patented Aug. 30, 1921.

Application filed September 16, 1920. Serial No. 410,700.

*To all whom it may concern:*

Be it known that I, CHARLES S. LOCKWOOD, a citizen of the United States, residing at No. 496 Clinton avenue, Newark, county of Essex, and State of New Jersey, have invented certain new and useful Improvements in Tie-Bars for Roller-Bearing Cage, fully described and represented in the following specification and the accompanying drawings, forming a part of the same.

This invention relates to a cage for holding in alinement the rolls which are used in a roller-bearing; and it relates particularly to the construction of tie-bars which are employed to hold the heads of the cage together and which are located between the rolls with their outer edges bent or shaped to embrace the rolls and retain them in the cage.

The tie-bars are made of twin members of identical form having tenons fitted to mortises in the heads, and the inner portion of the members being directed radially to the center of the cage and tangential to the rolls, and the wings or outer portions of the members being bent away from one another to contact with the outer half of the rolls, which serves to lock the rolls in the cage permanently. The radial parts of adjacent tie-bars necessarily incline toward one another and thus lock the rolls in the cage from the inner side.

It will be observed by reference to Fig. 2 that each member of a tie-bar bears upon the inner and outer sides of the roll, thus giving it an extended bearing and wearing surface.

The twin tenons of each tie-bar make a joint engagement with the same mortise, and when riveted therein form a very rigid cage.

This construction permits the tie-bars to be made of relatively thin sheet-metal while maintaining the stiffness that is necessary to hold the cage in cylindrical form.

The rolls are so spaced apart in the cage that the exterior sides of the members fit loosely between the rolls, and the outer wings of the members overlap loosely the outer sides of the rolls to retain them in the cage. (See Fig. 2.)

Where the sheet-metal is not of sufficient thickness to fill the space between the adjacent rolls, an intermediate packing-piece $h$ can be placed between the inner portions of the said members as shown in Fig. 11, and provided with tenons to engage the cage-heads, or with projections and sockets to engage the contiguous members, the piece $h$ thus forming a rigid part of the tie-bar.

The invention will be understood by reference to the annexed drawing, in which Figure 1 is an edge view of a cage provided with the improvement; Fig. 2 is an end view of the cage with one-half of the nearer head broken away; Fig. 3 shows the outer side of one of the cage-heads; and Fig. 4 a section of the same on line 4—4 in Fig. 3. Fig. 5 is a side view of a sheet-metal blank adapted to form one member of a tie-bar; Fig. 6 is an end view of said blank; Fig. 7 is a section of two such blanks laid together to show the engaging pin and socket, the view being taken on line 7—7 in Fig. 5. Fig. 8 is a side view, and Fig. 9 an end view of one member of a tie-bar having a wing $c$ bent to the required shape. Fig. 10 is a perspective view of such a member; and Fig. 11 is a view of two rolls with the tie-bar between them, having a packing-piece between the members.

The heads are lettered $a$ and provided with countersunk mortises $a'$. $b$ are the rolls which fit between the heads intermediate to the mortises as shown in Fig. 2. $c$ are the members, two of which are employed to form each tie-bar, the sheet-metal blank $c'$ shown in Figs. 5 and 6 being employed to form each member by bending its outer edge or wing $c$ sufficiently to fit loosely against the outer sides of the rolls. (See Fig. 2.)

To hold the two members in alinement when assembled to form a tie-bar, each member is formed at one end with a hole or socket $d$, and near the opposite end with a stud or pin $e$. By this construction the pins can be fitted to the opposite sockets, while maintaining a perfectly similar shape for both of the members thus greatly facilitating the construction.

The members are formed with tenons $f$ two of which lie together in each tie-bar as shown in Fig. 7; and the mortises are so proportioned as to admit the two tenons jointly upon one end of a tie-bar.

In securing the rolls in the cage, the series of twin members forming each tie-bar are engaged with all the mortises upon one of the heads, and the rolls are then set between the tie-bars as shown in Fig. 2, and the other head applied to the tenons at the outer ends thereof.

The mortises are countersunk upon the outer side as shown in Fig. 3, and the tenons may be secured in the mortises by upsetting, clenching, or electric riveting.

When securing the heads upon the tie-bars with the rolls in between, the heads are sustained by shoulders $g$ upon the opposite ends of the members, thus holding the heads at a suitable distance apart to slightly clear the ends of the rolls as indicated in Fig. 1.

It will be seen from the above description that the two members of each cage are of identical form and may be termed "twin bars." These members therefore require only means to manufacture a single piece represented by the structure of Figs. 8 and 9.

The use of lathe work to form the tie-bars is thus avoided, as the members are made wholly by press-work which stamps the blanks to the proper form (see Fig. 5) in one operation and bends the blanks as shown in Figs. 9 and 10 in the same or in a subsequent operation.

Each member, as shown in Figs. 2 and 11, owing to the inclination of the wings $c$, makes contact with the rolls at two points, thus affording more wearing surface than a guide which contacts with the rolls upon a single line.

The packing-piece $h$ is of flat rectangular form and requires no machine-work except means to form the studs $d$ or holes $e$ to engage holes or studs upon the two members.

The rectangular form of the tenon enables two of them, as shown in Fig. 7, to form an engagement jointly with a rectangular mortise.

Such mortises are shown at $a'$ in Fig. 3; but in Fig. 2 the mortises are shown filled with the tenons and the same flattened down flush with the outer surface of the head $a$.

Having thus set forth the nature of the invention what is claimed herein is:

1. A roller-bearing cage having mortises therethrough and tie-bars each formed with two similar members having tenons to jointly engage the opposite mortises in the heads, the inner portions of the members being disposed radially to the center of the cage and forming a tangential contact with the adjacent sides of the rolls, and the outer portions of the members bent tangentially to the rolls upon the outer half of the same.

2. A roller-bearing cage having tie-bars each formed with twin members, the said members having each a stud near one end and a socket at the opposite end, the said studs and sockets forming a double engagement of the said members.

3. A roller-bearing cage having tie-bars each formed of oppositely disposed members, and an intermediate packing-piece proportioned to hold the said members contiguous to the rolls.

4. A roller-bearing cage having tie-bars each formed of oppositely disposed members, and an intermediate packing-piece between the two portions of the said members, the outer portions of the members being shaped to embrace the outer sides of the roll.

In testimony whereof I have hereunto set my hand.

CHARLES S. LOCKWOOD.